J. B. RAMOS.
MACHINE FOR SHREDDING TRASH ON THE GROUND.
APPLICATION FILED SEPT. 21, 1915.
1,180,796.
Patented Apr. 25, 1916.
4 SHEETS—SHEET 4.
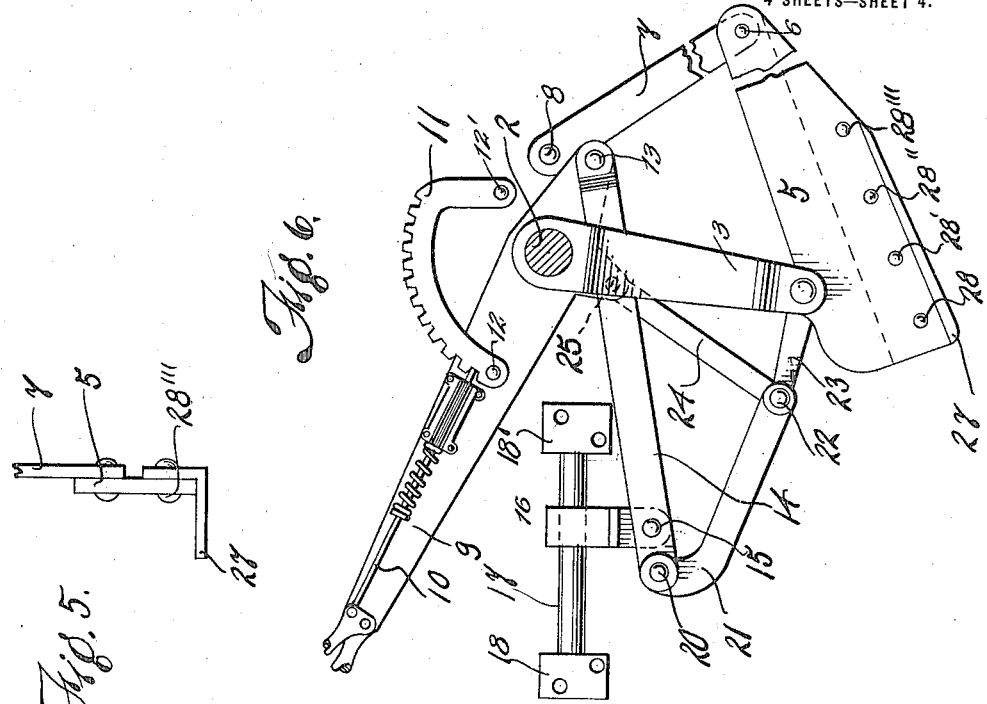
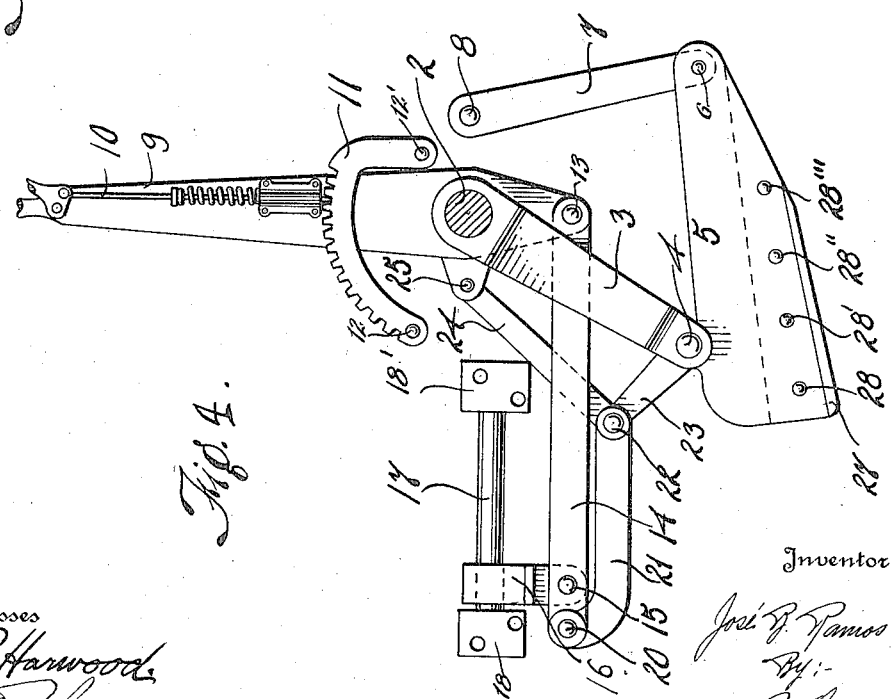
Witnesses
H. P. Harwood
W. E. Roche
Inventor
José B. Ramos
By:—
B. Ongun
Attorney

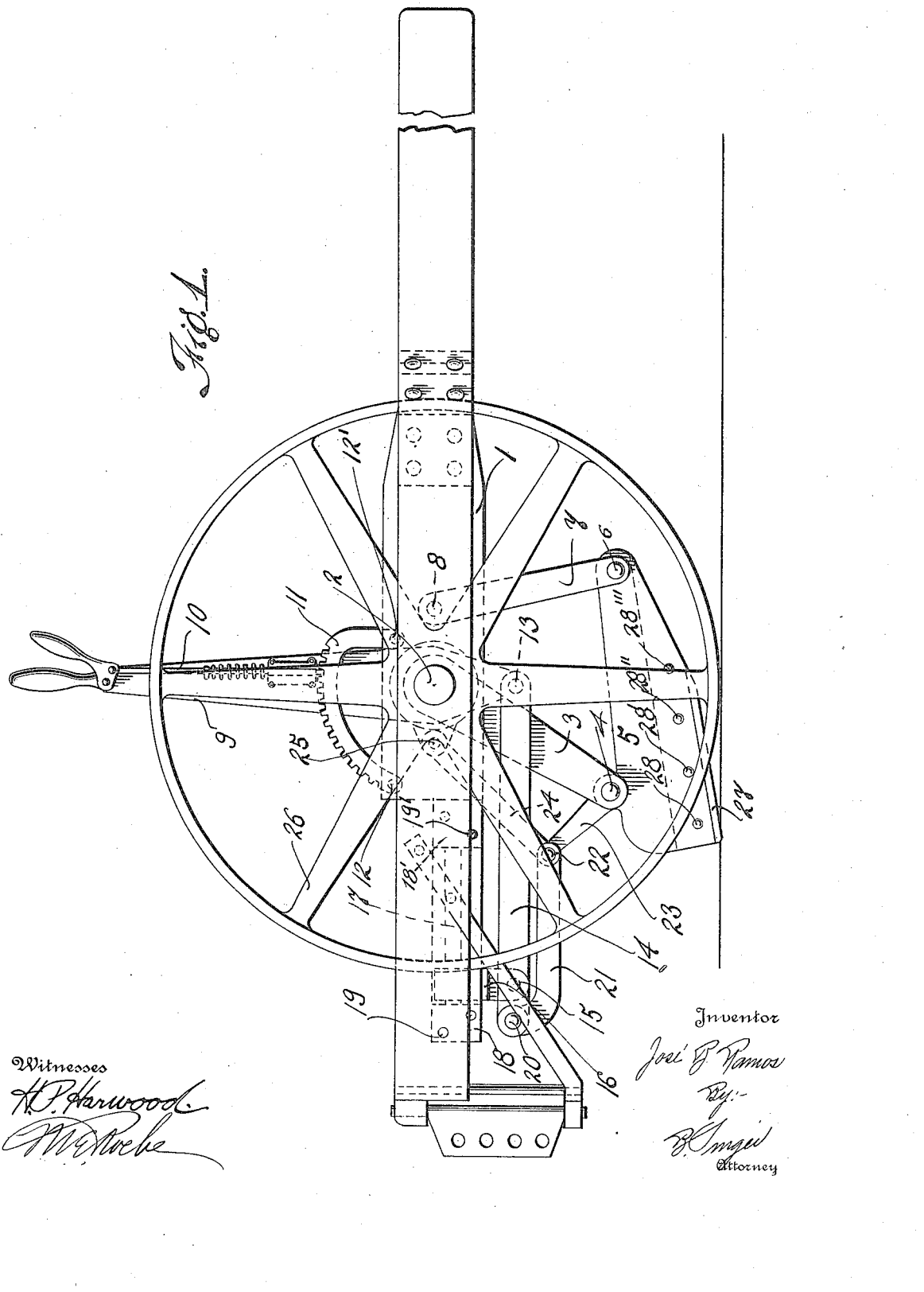

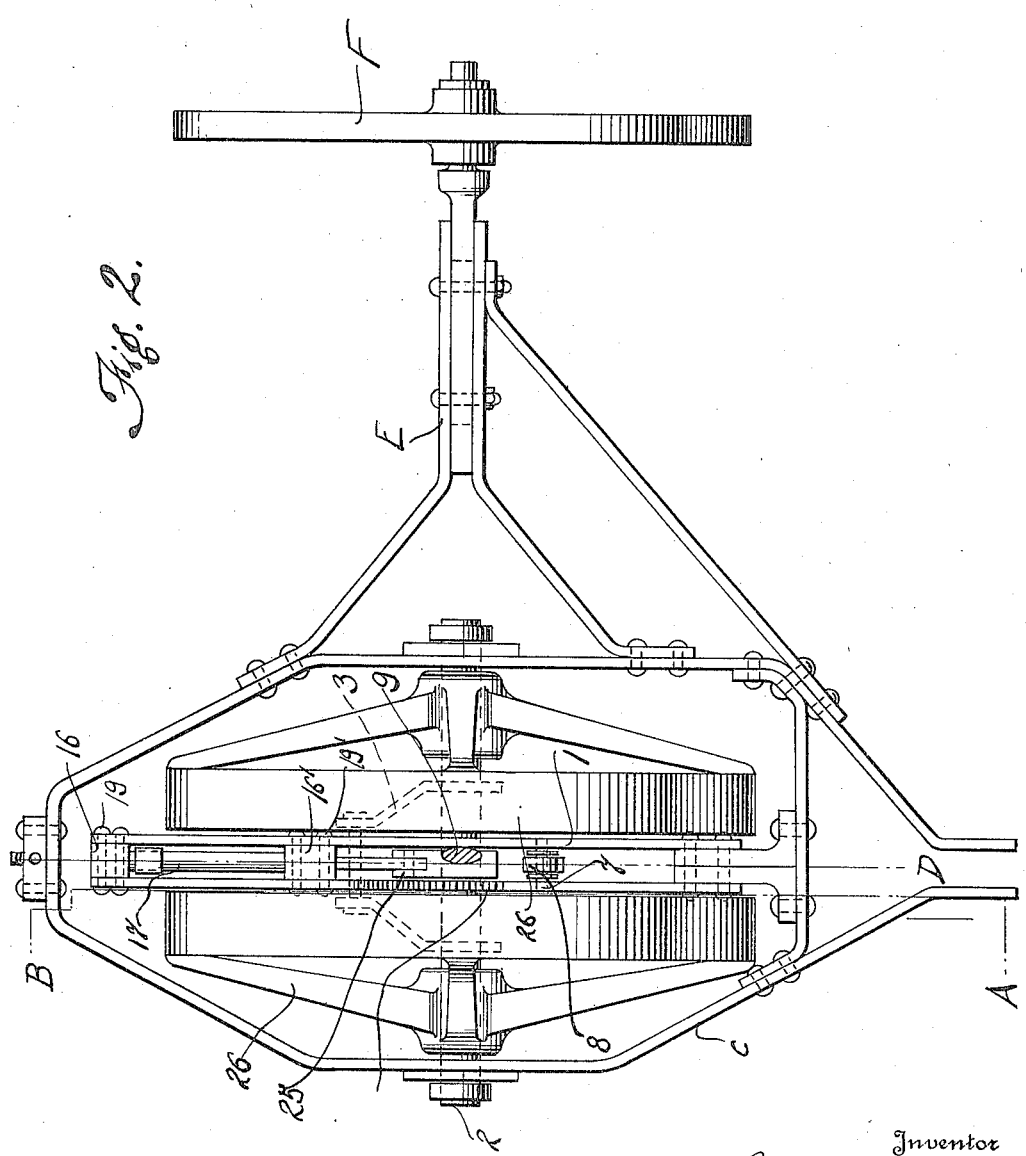

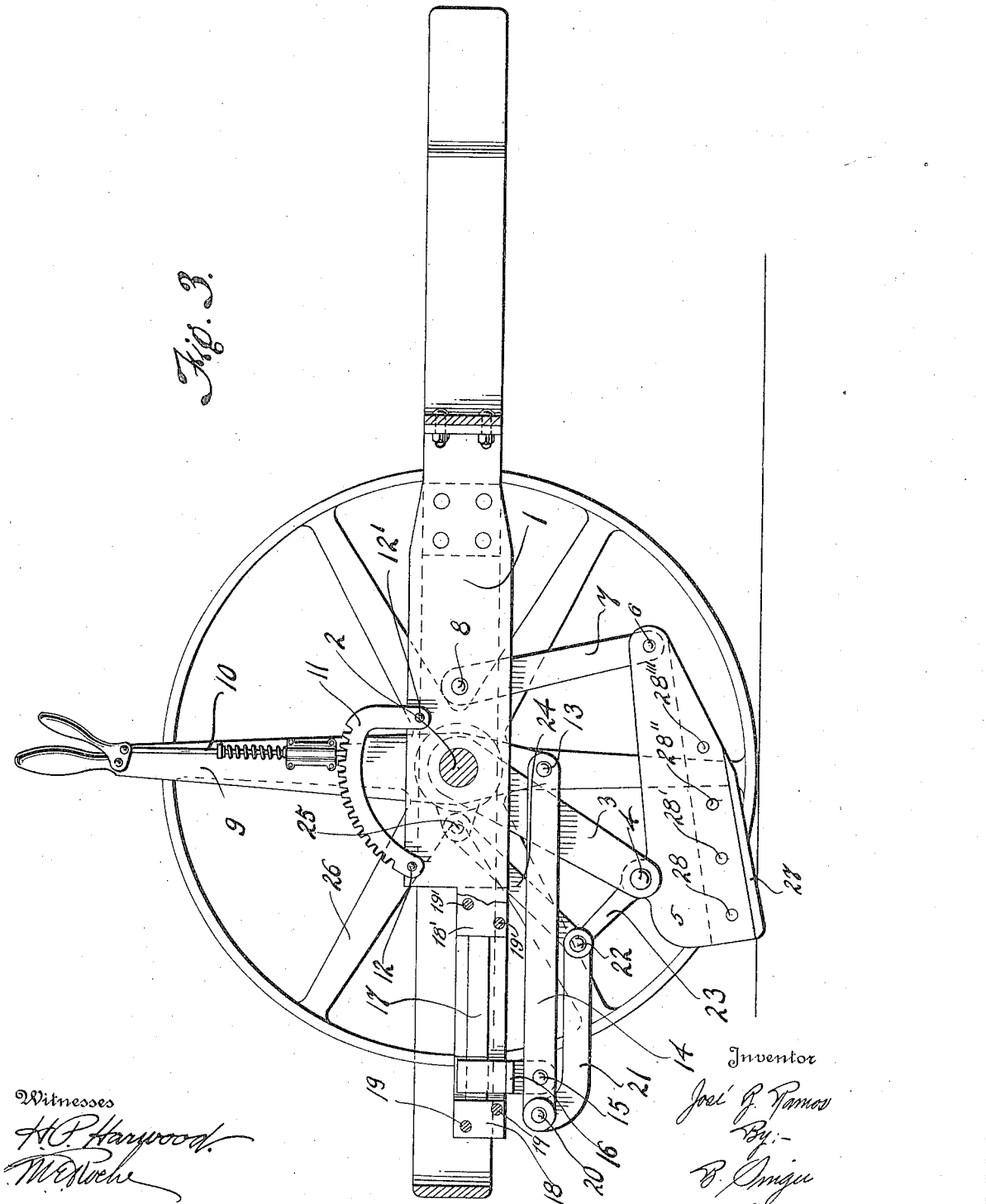

UNITED STATES PATENT OFFICE.

JOSÉ B. RAMOS, OF MARIANAO, CUBA.

MACHINE FOR SHREDDING TRASH ON THE GROUND.

1,180,796.  Specification of Letters Patent. Patented Apr. 25, 1916.

Application filed September 21, 1915. Serial No. 51,802.

*To all whom it may concern:*

Be it known that I, José B. Ramos, a citizen of the Republic of Cuba, residing at Marianao, Province of Habana, Republic of Cuba, have invented certain new and useful Improvements in Machines for Shredding Trash on the Ground, of which the following is a specification.

This invention relates to machines used for shredding the trash formed by dry leaves lying on the ground, after collection of crops, particularly to shred the trash from sugar cane in the cane fields, with the end in view afterward, when plowing the ground, the plows may substantially mix up the shredded trash with the earth so that it may serve as a fertilizer to the ground.

The object of this invention is to provide an improved construction of said type of machines having movable means for suspension of the cutting member or members in combination with means for regulating the operation of said cutting members, whereby the position of the cutting members will be varied according to the thickness of the layer of trash on the ground or in finding any obstruction thereon.

The invention is described with reference to the figures of the annexed drawings, in which:

Figure 1 is a side elevational view of a machine constructed in accordance with the invention. Fig. 2 is an upper plan view of said machine. Fig. 3 is a vertical section of same machine on line A—B of Fig. 2. Fig. 4 is a detail view in elevation showing the mechanism for controlling the trash cutter. Fig. 5 is a front view of a portion of the mechanism shown in Fig. 4, showing the trash cutter. Fig. 6 is a view similar to Fig. 4 but showing the parts in different positions.

This machine comprises a central frame formed by two longitudinal plane pieces 1 vertically arranged and separated horizontally, which are connected at their ends by means of pins and are perforated on their central portion so as to serve as a bearing to a transverse shaft 2 on which the treading wheels 26 are revolubly mounted. Said frame 1 and shaft 2 support the device used for shredding the trash and certain regulating means for operation of said device, the regulating means consisting of a hand lever 9 revolubly mounted on the shaft 2 between the two pieces 1 of the frame and connected at its lower end by means of a pivot 13 to the end of a forked link 14 pivoted at a point near its other end by means of a pin 15 between two lugs projecting downwardly from a block-piece 16 slidably mounted on a cylindrical guide bar 17 fixed between the two block-pieces 18 and 18′ which are secured between the pieces 1 of the frame by means of the pins 19 and 19′. Link 14 is connected at its free end by means of a pivot 20 to an elbowed link 21 below the link 14 which in turn is connected by a pivot 22 to the connecting bar 24 which is interconnected by a pivot 25 to two lugs projecting from hand lever 9 on its rear central part, between the two pieces 1. Holder 5 supporting cutting-member 27 by means of pins 28, 28′, 28″ and 28‴ is movably suspended from shaft 2 on the frame 1 by means of suspension curved arms 3 revolubly mounted on shaft 2 and which are connected by a pivot 4 to the upper rear part of the holder 5, holder 5 being also suspended from the two pieces 1 by means of a suspension arm 7 which is connected by a pivot 6 to holder 5 and is mounted at its upper end on the pivot or pin 8 fixed between the two pieces 1 in front of shaft 2. The articulating point of elbowed link 21 and connecting bar 24 is connected to the articulating point of holder 5 and suspension arm 3 by means of a link 23.

On upper edge of one of the longitudinal pieces 1 of the frame and fixed by pins 12 and 12′ is placed an indented segment 11 with the teeth of which engages the lower end of a latch rod 10 supported from a side of the lever 9 and which is slidable against the elastic action of a spring within a bracket fixed to said lever 9, said rod 10 being actuated by means of an angular lever pivoted on the upper part of the lever 9, the rod 10 and the indented segment 11, forming the means for fixing in a predetermined position the lever 9 and the annexed connecting members which form the regulating means for the operation of the cutting-member 27.

Surrounding the frame 1 and treading wheels 26, there is arranged the frame C, which is mounted on shaft 2 and is connected to frame 1 by means of angular pieces in its forward end, said frame C having in its front end an opening D through which the machine is connected to any traction means which may be employed.

Said frame C has a lateral extension E provided with an end journal on which is mounted a treading wheel F that aids in supporting the machine on the ground.

The operation of the machine is as follows:—Being placed on the ground, the same is connected to the traction means through the opening D of the frame C. Then, by manipulating the lever 9 and the small lever 10, the cutting-member 27 is carried to the position shown in Fig. 3 and the machine is made to travel on wheels 26 and F, whereby the cutting member will shred the trash lying on the ground as the machine advances. Whenever it is desired to change the position of the cutting-member 27, the operator will disengage the rod 10 from the indented segment 11 which holds in position the lever 9 and a backward or forward movement is given to this lever, thereby causing the cutting member to withdraw upwardly at its rear part or to extend downwardly, as it may be respectively desired to avoid any obstruction on the ground or when the trash is in such an amount that it forms too thick a layer on same.

It is obvious that the form of the lever 9 and of the connecting members of same to the knife-holder can be varied as well as that of the members for securing the lever 9, without departing from the essential features of the invention, which are as pointed out hereinafter.

What I claim is:—

1. In machines for shredding trash on the ground, in combination, a shaft on treading wheels, a frame fixed on said shaft, a cutting-member, a holder for the cutting-member, suspension arms for said holder which are revolubly mounted on said shaft and on a pivot in the front part of the frame, a hand lever revolubly mounted on said shaft for regulating the operation of the cutting-member, connecting members between said hand lever and said holder, and means for holding in a predetermined position said hand lever with respect to the frame.

2. In machines for shredding trash on the ground, in combination, a shaft on treading wheels, a frame fixed on said shaft, a knife, a knife-holder, suspension arms for the rear part of the knife-holder which are revoluble on said shaft, suspension arms for the front part of the knife-holder which are revoluble on a pivot in the front part of the frame, a hand lever revolubly mounted on the shaft of the treading wheels to regulate the operation of the knife, a link connecting the lower end of said hand lever to a block-piece longitudinally slidable on a guide bar fixed in the frame, a bar connecting the central rear part of the hand lever to an elbowed link which is connected to the other end of the connecting link before mentioned, a link connecting the rear part of the knife-holder to the articulating point of the connecting bar and the elbowed link above mentioned, and means for holding the hand lever in a predetermined position on the frame.

In testimony whereof, I have hereunto set my hand in presence of two subscribing witnesses.

JOSÉ B. RAMOS.

Witnesses:
RICARDO MORÉ,
L. A. CHRISTY.

Copies of this patent may be obtained for five cents each, by addressing the "Commissioner of Patents, Washington, D. C."